United States Patent
He

(10) Patent No.: US 7,839,956 B1
(45) Date of Patent: Nov. 23, 2010

(54) METHOD AND APPARATUS FOR DC OFFSET COMPENSATION IN A DIGITAL COMMUNICATION SYSTEM

(75) Inventor: Shousheng He, Södra Sandby (SE)

(73) Assignee: Telefonaktiegolaget L M Ericsson (Publ), Stockholm (DE)

(*) Notice: Subject to any disclaimer, the term of this patent is extended or adjusted under 35 U.S.C. 154(b) by 1068 days.

(21) Appl. No.: 10/527,783

(22) PCT Filed: Sep. 15, 2003

(86) PCT No.: PCT/EP03/10245

§ 371 (c)(1),
(2), (4) Date: Sep. 14, 2006

(87) PCT Pub. No.: WO2004/034661

PCT Pub. Date: Apr. 22, 2004

Related U.S. Application Data

(60) Provisional application No. 60/413,798, filed on Sep. 25, 2002.

(30) Foreign Application Priority Data

Sep. 16, 2002 (EP) .................................. 02256376

(51) Int. Cl.
*H04L 25/06* (2006.01)
(52) U.S. Cl. ........................................ 375/319; 375/349
(58) Field of Classification Search .............. 375/319, 375/346, 347, 349, 267, 136, 148, 150; 455/500, 455/132; 342/352, 357

See application file for complete search history.

(56) References Cited

U.S. PATENT DOCUMENTS 6,571,090 B1 * 5/2003 Moriyama et al. ........ 455/277.1
6,967,992 B1 * 11/2005 Rabaeijs et al. ............. 375/150

FOREIGN PATENT DOCUMENTS

WO WO-01/31867 5/2001

OTHER PUBLICATIONS

Rolf Johansson; "System Modeling and Identification"; Department of Automatic Control Lund Institute of Technology, Prentice Hall, Englewood Cliffs, NJ 07632; pp. 82-85, 126-127, 464-465 2005.
Lindoff, Bengt, "Using A Direct Conversion Receiver In Edge Terminals-A New DC Offset Compensation Algorithm", 11th IEEE International Symposium on Personal Indoor and Mobile Radio Communications, Sep. 18-21, 2000, (pp. 959-963).

* cited by examiner

*Primary Examiner*—Khai Tran
(74) *Attorney, Agent, or Firm*—Roger S. Burleigh

(57) ABSTRACT

A method of compensating for dc offset of a received signal transmitted over a channel having a plurality of paths, the received signal comprising a modulated data signal and a modulated known training sequence signal, the method comprising the steps of: constructing (104) from the known training sequence signal a first regression matrix; path-combining (106) the incrementally rotated elements of the first regression matrix to produce the elements of a trend matrix; deriving (108) a neutralized second regression matrix from the first regression matrix and the trend matrix; utilising the neutralized second regression matrix to compensate (110, 112) for dc offset of the received modulated data signal.

10 Claims, 1 Drawing Sheet

METHOD AND APPARATUS FOR DC OFFSET COMPENSATION IN A DIGITAL COMMUNICATION SYSTEM

This patent application claims the benefit of priority from U.S. Provisional Patent Application Ser. No. 60/413,798 filed on Sep. 25, 2002. This application incorporates by reference the entire disclosure of U.S. Provisional Patent Application Ser. No. 60/413,798.

TECHNICAL FIELD

The present invention relates to DC offset (or biased noise) compensation in digital communication systems. In particular, but not exclusively, it relates to biased noise/DC offset compensation in digital communication systems where a known training sequence of limited length is transmitted together with data burst for the estimation of a multi-path (or multi-tap) signal propagation channel, such as in a normal burst of TDMA/GSM/EDGE systems.

BACKGROUND OF THE INVENTION

The problem with biased noise/DC offset exists in, among others, homodyne receivers that convert radio frequency signal directly into base band signal. Various factors such as components mismatch, local oscillator leakage and interferences may contribute to this distortion. When the modulation of the transmitted signal consists of a rotation operation, for example in GSM/EDGE systems, the DC offset will causes a single frequency trend in the received signal after de-rotation (demodulation). If this frequency trend is left uncompensated, the DC offset can cause significant receiver performance degradation.

Several methods are known and are currently used for compensation of the DC offset.

One such known method is blind DC estimation. This is the simplest and most straightforward method. The received signal is averaged before de-rotation. When this is applied to TDMA systems which have limited symbols in a burst, this method is not accurate due to uncertainty of the data symbols in the transmission.

Another such known method is joint channel and DC estimation. This is used when the DC offset has been treated as an extra tap in the multi-tap channel estimation, utilising the constellation rotation as a reference, for example the $\pi/2$ rotation in GSM and the $3\pi/8$ rotation in the EDGE modulation. It has been observed, however, that the performance of this method depends on the training sequence used. It does not perform well when a training sequence has high amplitude at the trend frequency. Further, the accuracy of channel estimation is compromised due to the fact that an extra parameter needs to be estimated with the same training sequence. In addition, the performance is also affected by the form of burst synchronisation.

A further known method is referred to as classical trend elimination as disclosed for example in "System Modelling and Identification"; R. Johansson, in particular pages 83 to 85, pages 126 and 127 and pages 464 and 465. This is a method in system identification. When a stimulating sequence $\{t_k\}$ of length n is applied to a linear system with m parameters, a system response $\{x_k\}$ of length n is collected for the system identification. Trend elimination modifies the system model where neutralized sequences are used for both stimulus and observation. The neutralized sequence of the stimulus $s_k$ and the neutralized sequence of the observation (input signal) $y_k$ are derived as follows:

$$s_k = t_k - \tau \quad \tau = \frac{1}{n}\sum_{i=0}^{n-1} t_i$$

$$y_k = x_k - \rho \quad \rho = \frac{1}{n}\sum_{i=0}^{n-1} x_i$$

This method, however, can be employed only if either the training sequence, the stimulus, is significantly longer than the model order n>>m, or just a single parameter is sufficient for system identification. It cannot be applied in a digital communication system where a multi-path channel is required to be estimated with a limited training sequence.

SUMMARY OF THE INVENTION

A generalised trend elimination processing is proposed, where a single frequency trend, possibly a pure DC offset when the trend frequency is zero, is taken into consideration in an unbiased multi-path channel estimation to compensate for the biased noise/DC offset.

The DC offset estimation/compensation of the present invention may be utilised in a radio receiver working in a multi-path channel environment with or without rotation modulation. The estimation/compensation method of the present invention can provide better channel estimation in the presence of biased noise or DC offset since the method of the present invention reduces the sensitivity to the distortion.

This is achieved by adjusting the trend suppression level such that the channel estimation is less variant when different training sequences, or different training sequence segments are used.

The method of the present invention is computationally simpler since the initial channel estimation is separated from DC offset estimation. In addition, path-trend vectors can be pre-calculated, which further reduces the computational load.

The invention extends trend elimination (bias/DC offset compensation) to include single frequency trends and enables multi-path channel estimation with relatively short training sequences. The term DC offset is generalised to include an additive single frequency component which causes static (zero frequency) or incremental (non-zero frequency) phase offset. Depending on the rotation scheme in the modulation, this phase offset increment can be considered as the normalised trend frequency. The objective of the invention is to acquire channel estimation with eliminated/suppressed trend and to obtain trend estimation for DC offSet compensation.

DETAILED DESCRIPTION OF PREFERRED EMBODIMENTS

Figure 1:
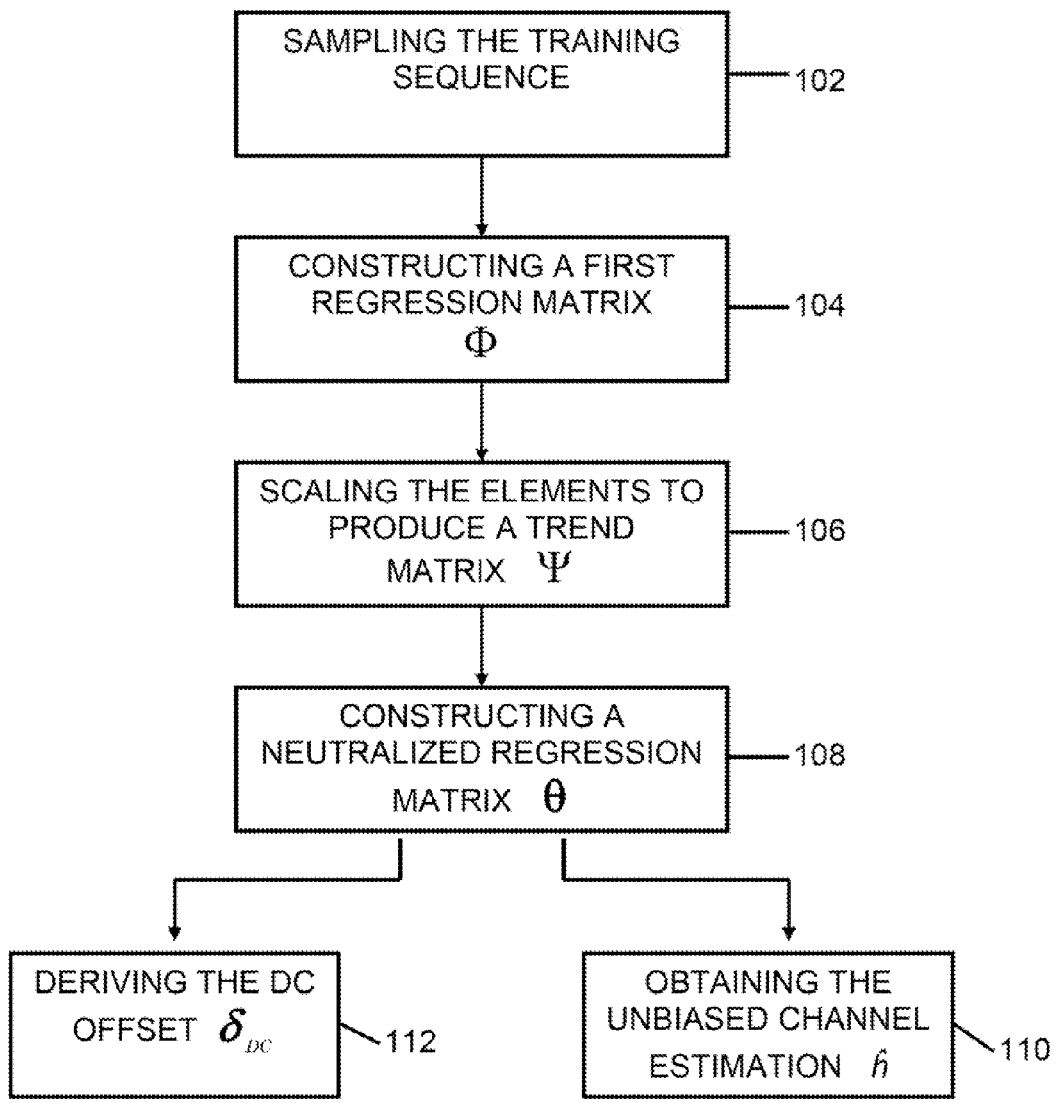
FIG. 1 is a flow diagram illustrating the method according to an embodiment of the present invention.

An embodiment of the present invention will now be described with reference to FIG. 1. The digital communication system comprises a modulator and transmitter (not shown here). The modulator modulates a signal for transmission using known techniques. The signal to be transmitted comprises a plurality of data bits and a plurality of training sequence bits which constitute a normal burst. The training sequence being a sequence of bits known by the receiver of the digital communication system allows the receiver to determine precisely the position of the data bits within a burst, and to enable the receiver to derive the distortion caused by transmission etc. In the digital communication system in which the method of the present invention is utilised, transmission of the burst is made over a multi-path propagation channel comprising m-taps. The distortion is derived, in part, from an estimation of the propagation channel. Application of the training sequence to the channel estimation provides the distortion when the result is compared to the actual received training sequence.

In general, linear regression with Least-Squares (LS) error criterion is used to obtain channel estimation in digital communication systems. In LS estimation, the estimation model can be expressed as $$x = \Phi h + v$$

which includes a channel vector (m is the span of the channel), $$h = [h_0 h_1 \ldots h_{m-1}]^T$$

a received signal vector $$x = [x_0 x_i \ldots x_{n-m}]^T$$

a noise vector $$v = [v_0 v_1 \ldots v_{n-m}]^T$$

and a regression matrix $$\Phi = [\Phi_0 \Phi_1 \ldots \Phi_{m-1}] = \begin{bmatrix} t_{m-1} & t_{m-2} & \cdots & t_1 & t_0 \\ t_m & t_{m-1} & \cdots & \cdots & \cdots \\ \cdots & \cdots & \cdots & \cdots & \cdots \\ \cdots & \cdots & \cdots & \cdots & \cdots \\ t_{n-1} & \cdots & \cdots & \cdots & t_{n-m} \end{bmatrix}$$

where each column vector in the regression matrix is defined as the-path-regression vector $$\Phi_k = [t_{m-1-k} t_{m-k} \cdots t_{n-2-k} t_{n-1-k}]^T$$

Therefore, the regression matrix $\Phi$ is constructed 104 from samples of a known training sequence of a received signal by minimising the least-square error, without DC compensation, channel estimation with LS results in $$\hat{h} = (\Phi^T \Phi)^{-1} \Phi^T x$$

In the presence of DC offset, this equation gives erroneous results.

In the method of an embodiment of the present invention, a trend matrix $\Psi$ of the same dimension as $\Phi$ is introduced 106, in which each column is defined as a path-trend vector of size $n-m+1$ $$\Psi_k = \frac{\Omega}{(n-m+1)} \Phi_k = \frac{\omega \cdot \omega^*}{(n-m+1)} \Phi_k$$

where ( )* notifies conjugate transposition, and $\Omega$ is a Toeplitz matrix generated by the rotation vector $\omega$, (the de-rotation vector having the form of $\omega^*$), where $$\omega = [1 e^{j\beta} e^{j2\beta} \ldots e^{j(n-m)\beta}]^T$$

The phase shift (the nominal trend frequency) $\beta$ in the rotation vector is system dependent. For example, in GSM $\beta = \pi/2$ while in EDGE $\beta = 3\pi/8$. When $\beta = 0$, i.e. the constellation does not rotate in the modulation, $\Omega$ degenerates to a unit matrix with every element equal to 1, and the path-trend vector degenerates to a unit vector in the regression matrix as $$\Psi_k(l)\Big|_{\beta=0} = \frac{1}{n-m+1} \sum_{i=0}^{n-m} \phi_k(i)$$
$$= \frac{1}{n-m+1} \sum_{i=0}^{n-m} t_{k+i},$$
$$l = 0, \ldots, n-m$$

The method according to an embodiment of the present invention constructs 108 a new "neutralized" path-regression vectors:

$$\theta_k = \phi_k - \psi_k, k = 0, 1, \ldots, m-1$$

and a new regressor matrix $$\Theta = \Phi - \Psi = [\theta_0, \theta_1 \ldots \theta_{m-1}]$$

Utilising this new regression matrix and the neutralised receiving signal, $$y = x - \rho \ \rho = \frac{\Omega}{n-m+1} x = \frac{\omega \cdot \omega^*}{n-m+1} x$$

where the receiving trend vector p depends also on the modulation rotation and can degenerate to an average when $\beta = 0$, the new model can then be described as $$y = \Theta h + v$$

and an unbiased channel estimation is obtained 110.

$$\hat{h} = (\Theta^T \Theta)^{-1} \Theta^T y$$

Further, the equation above also provides an implicit DC (i.e. the trend) estimation. The offset vector can be then calculated 112 as $$\delta_{DC} = \alpha_{DC} \omega^* = \rho - \Psi \hat{h}$$

The amplitude of the offset can be determined as $$\alpha_{DC} = \frac{\delta_{DC} \cdot \omega}{n-m+1}$$

In practise, complete trend elimination may be not desirable since it can damage the quality of the cross correlation between original and de-trended training sequence $E\{\phi\psi^*\}$ which is essential to the accuracy of the channel estimation. Computational considerations will also prefer a real, instead of complex, training sequence in the operation. A compromised modification of the new "neutralized" patin-regression vectors is thus $$\theta_k = \phi_k - \mu Re(\psi_k)$$

where the real part of the trend vector is taken out and scaled down ($0 < \mu < 1$) before subtracted from the path regression vector. Trend suppression, instead of trend elimination is incorporated in the processing. For different training sequences, which have different amplitude at the trend frequency, different suppression level may be applied by choosing different $\mu$.

The method above, therefore, constructs path trend vectors for each path from rotation vector and path regression vector. The method provides a path trend elimination/suppression model for channel estimation, using a modified "neutralized" regression matrix in LS channel estimation. It separates the channel estimation and DC estimation by eliminating/suppressing DC offset in the channel estimation. Implicit DC offset estimation is obtained by combination of the de-trended path—regression and de-trended receiving signal. Application of the method of the present invention in linear system identification can be achieved with short stimulus and biased/single frequency offset noise.

Although a preferred embodiment of the method and apparatus of the present invention has been illustrated in the accompanying drawing and described in the forgoing detailed description, it will be understood that the invention is not limited to the embodiment disclosed, but is capable of numerous variations, modifications without departing from the scope of the invention as set out in the following claims.

The invention claimed is:

1. A method of compensating for dc offset of a received signal transmitted over a channel having a plurality of paths, the received signal comprising a modulated data signal and modulated known training sequence signal bits, the method comprising the steps of:
    constructing from the known training sequence signal, a first regression matrix;
    constructing from the first regression matrix, a trend matrix wherein each column of the trend matrix is a path-trend vector;
    deriving a neutralized second regression matrix from the first regression matrix and the trend matrix; and
    utilising the neutralized second regression matrix to compensate for dc offset of the received modulated data signal.

2. A method according to claim 1, wherein the path-trend vectors are derived by $$\Psi_k = \frac{\Omega}{(n-m+1)}\Phi_k = \frac{\omega \cdot \omega^*}{(n-m+1)}\Phi_k$$

wherein $\Psi_k$ is a path-trend vector $\Omega$ is a Toeplitz matrix generated by a rotation vector $\omega$ ($\omega^*$ is the de-rotation vector) $\Phi_k$ is the corresponding element of the first regression matrix, n is the number of symbols in the training sequence and m is the number of paths of the channel.

3. A method according to claim 1, wherein the neutralized second regression matrix comprises the difference between the first regression matrix and the trend matrix.

4. A method according to claim 1, wherein the neutralized second regression matrix comprises the difference between the first regression matrix and the real part of the elements of the trend matrix.

5. A method according to claim 4, wherein the real part of the elements of the trend matrix are scaled by a suppression factor.

6. A method according to claim 1, wherein the dc offset is estimated from a trend vector of the received signal, the trend matrix and channel estimation.

7. A method according to claim 6, wherein the channel estimation is derived using Least-Squares technique.

8. A method of calculating an unbiased channel estimation for a multi-path propagation channel, the method comprising the steps of:
    constructing a first regression matrix from a known training sequence signal of an input signal;
    constructing from the first regression matrix, a trend matrix wherein each column of the trend matrix is a path-trend vector;
    deriving a neutralized second regression matrix from the first regression matrix and the trend matrix; and
    calculating the unbiased channel estimation using the neutralized second regression matrix.

9. A method according to claim 8, wherein the path-trend vectors are derived by $$\Psi_k = \frac{\Omega}{(n-m+1)}\Phi_k = \frac{\omega \cdot \omega^*}{(n-m+1)}\Phi_k$$

wherein $\Psi_k$ is a path-trend vector $\Omega$ is a Toeplitz matrix generated by a rotation vector $\omega$ ($\omega^*$ is the de-rotation vector) $\Phi_k$ is the corresponding element of the first regression matrix, n is the number of symbols in the training sequence and m is the number of paths of the channel.

10. A method according to claim 8, wherein the neutralized second regression matrix comprises the difference between the first regression matrix and the trend matrix.

* * * * *

UNITED STATES PATENT AND TRADEMARK OFFICE
CERTIFICATE OF CORRECTION

| | | |
|---|---|---|
| PATENT NO. | : 7,839,956 B1 | Page 1 of 1 |
| APPLICATION NO. | : 10/527783 | |
| DATED | : November 23, 2010 | |
| INVENTOR(S) | : He | |

It is certified that error appears in the above-identified patent and that said Letters Patent is hereby corrected as shown below:

On the Title Pg, Item (73), under "Assignee", Line 1, delete "Telefonaktiegolaget" and insert -- Telefonaktiebolaget --, therefor.

On the Title Pg, below Item (87), insert Item -- (65) Prior Publication Data US 2010/0284496 A1 Nov. 11, 2010 --.

In Column 2, Line 49, delete "offSet" and insert -- offset --, therefor.

In Column 3, Line 65, delete "Pin" and insert -- β in --, therefor.

In Column 4, Line 31, delete "p" and insert -- ρ --, therefor.

Signed and Sealed this
Eighteenth Day of October, 2011

David J. Kappos
*Director of the United States Patent and Trademark Office*